United States Patent
Kwak et al.

(10) Patent No.: US 9,413,039 B2
(45) Date of Patent: Aug. 9, 2016

(54) BATTERY PACK

(75) Inventors: Eunok Kwak, Yongin-si (KR); Seok Koh, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1339 days.

(21) Appl. No.: 12/654,581

(22) Filed: Dec. 23, 2009

(65) Prior Publication Data

US 2010/0178536 A1     Jul. 15, 2010

(30) Foreign Application Priority Data

Jan. 9, 2009   (KR) .................. 10-2009-0001872

(51) Int. Cl.
| | |
|---|---|
| *H01M 2/20* | (2006.01) |
| *H01M 10/42* | (2006.01) |
| *H01M 2/02* | (2006.01) |
| *H01M 2/04* | (2006.01) |
| *H01M 2/22* | (2006.01) |
| *H01M 2/30* | (2006.01) |
| *H01M 10/04* | (2006.01) |

(52) U.S. Cl.
CPC .......... *H01M 10/425* (2013.01); *H01M 2/0207* (2013.01); *H01M 2/0404* (2013.01); *H01M 2/0469* (2013.01); *H01M 2/0473* (2013.01); *H01M 2/22* (2013.01); *H01M 2/30* (2013.01); *H01M 10/0436* (2013.01)

(58) Field of Classification Search
None
See application file for complete search history.

(56) References Cited

U.S. PATENT DOCUMENTS

| | | | | |
|---|---|---|---|---|
| 6,382,997 | B2 * | 5/2002 | Semmeling et al. | 439/181 |
| 6,551,143 | B2 * | 4/2003 | Tanaka et al. | 439/682 |
| 2004/0191616 | A1 | 9/2004 | Hirota | |
| 2005/0221175 | A1 * | 10/2005 | Yoon | 429/164 |
| 2006/0128229 | A1 * | 6/2006 | Peng et al. | 439/682 |
| 2008/0081254 | A1 | 4/2008 | Kim et al. | |
| 2008/0152994 | A1 | 6/2008 | Yamagami et al. | |
| 2010/0003585 | A1 | 1/2010 | Takahashi et al. | |

FOREIGN PATENT DOCUMENTS

| | | |
|---|---|---|
| CN | 101084593 | 12/2007 |
| EP | 1202401 A2 | 5/2002 |
| EP | 1906469 A1 | 4/2008 |

(Continued)

OTHER PUBLICATIONS

Korean Notice of Allowance issued by KIPO, dated May 13, 2011, corresponding to Korean Patent Application No. 10-2009-0001872, together with Request for Entry.

(Continued)

*Primary Examiner* — Maria J Laios
(74) *Attorney, Agent, or Firm* — Robert E. Bushnell, Esq.

(57) ABSTRACT

The present invention relates to a battery pack including a bare cell for charge/discharge of an electric current; a protection circuit board electrically connected to the bare cell and protecting the bare cell against overcharge/discharge thereof; a connector serving as a current path between the bare cell and an external apparatus; a cover frame disposed on the bare cell to cover the protection circuit board; and a connector housing where the connector is disposed and which is exposed to the outside of the cover frame. The assembly strength of the battery pack is improved due to solid mounting of the connector housing on the protection circuit board and non-separable connection of the connector housing and the cover frame.

16 Claims, 5 Drawing Sheets

(56) References Cited

FOREIGN PATENT DOCUMENTS

| | | |
|---|---|---|
| JP | 07029739 A | 1/1995 |
| JP | 2004-296365 A | 10/2004 |
| JP | 2006107922 | 4/2006 |
| JP | 2006-179212 A | 7/2006 |
| JP | 2008-84814 A | 4/2008 |
| JP | 2008140711 | 6/2008 |
| JP | 2008-166210 A | 7/2008 |
| JP | 2008-218080 A | 9/2008 |
| KR | 1020070106842 | 11/2007 |
| WO | 2006067918 A2 | 6/2006 |

OTHER PUBLICATIONS

Japanese Office action issued by Japanese Patent Office on Jul. 3, 2012, corresponding to JP2009-275579 and Request for Entry attached herewith.

Chinese Office Action issued on Feb. 17, 2012 in connection with Chinese Patent Application Serial No. 201010000484.1, which also claims Korean Patent Application Serial No. 10-2009-0001872 as its priority document, and Request for Entry of the Accompanying Office Action attached herewith.

\* cited by examiner

BATTERY PACK

CLAIM OF PRIORITY

This application makes reference to, incorporates the same herein, and claims all benefits accruing under 35 U.S.C. §119 from an application earlier filed in the Korean Intellectual Property Office on 9 Jan. 2009 and there duly assigned Serial No. 10-2009-0001872.

BACKGROUND OF THE INVENTION

1. Field of the Invention

Embodiments relate to a battery pack.

2. Description of the Related Art

In recent years, there have been actively developed and produced compact and light portable electric/electronic devices such as cellular phones, notebook computers, camcorders, etc. Therefore, the portable electric/electronic devices are equipped with built-in battery packs, such that these devices can be operated even in places where additional power sources are not furnished. The battery packs recently employ chargeable/dischargeable secondary batteries in terms of economic interests. Typical examples of the secondary batteries may include a nickel-cadmium (Ni—Cd) battery, a nickel-metal hydride (Ni-MH) battery, a lithium (Li) battery and a lithium ion (Li-ion) secondary battery. In particular, the lithium ion secondary battery has a high drive voltage which is three times higher than that of the Ni—Cd or Ni-MH battery that is widely used as a power source for portable electronic devices. Further, the lithium ion secondary battery has a high energy density per unit weight.

Generally, the secondary batteries use a lithium oxide as a positive electrode active material and a carbonaceous material as a negative electrode active material, respectively. Lithium secondary batteries are classified into two groups, i.e. liquid electrolyte batteries and polymer electrolyte batteries, depending on the kinds of electrolytes. The batteries using liquid electrolytes are referred to as lithium ion batteries, whereas the batteries using polymer electrolytes are referred to as lithium polymer batteries.

The secondary battery is formed by electrical connection of a bare cell including an electrode assembly and an electrolyte in a case with a protection circuit board. The bare cell performs charge and discharge of electricity via chemical reactions, and the protection circuit board prevents overcharge and overdischarge of the bare cell to thereby protect the bare cell. An assembled state of the bare cell and the protection circuit board is referred to as a core-pack. The protection circuit board of the core pack is provided with a connector. The connector transmits an electric current generated from the bare cell to an external device during discharge of the battery, and serves as a current-charging path during charging of the battery.

In addition, the core pack is resin-molded or is provided with the attachment of an insulating frame, in order to electrically insulate the bare cell from the protection circuit board and protect the bare cell against external impact.

The resin molding of the core pack has a disadvantage of poor moldability. For this reason, assembling of the insulating frame into the core pack is popular. However, the insulating frame is vulnerable to external impact.

As a consequence, upon connection of the core pack to the insulating frame, the connector may be separated from the protection circuit board due to external impact. Further, application of external impact may result in separation of the insulating frame from the core pack.

SUMMARY OF THE INVENTION

One aspect of the present invention is provides a battery pack, which separate installation of a connector housing, in which a connector is disposed, from other components.

Another aspect of the present invention provides a battery pack having an assembly structure of a connector housing wherein the connector housing is pre-connected to a protection circuit board, followed by post-connection with a cover frame.

Another aspect of the present invention provides a battery pack having a strength-enhanced mounting of a connector housing on a protection circuit board.

Another aspect of the present invention provides a battery pack having a connecting structure of a connector housing with a cover frame.

Another aspect of the present invention is a battery pack including a bare cell for producing electric current, a protection circuit board electrically connected to the bare cell and protecting the bare cell against overcharge and overdischarge thereof, a connector mounted on the protection circuit board where the connector electrically connecting the bare cell to an external apparatus, a connector housing for accommodating the connector, and a cover frame for covering the protection circuit board, the connector housing not being covered by the cover frame.

The protection circuit board may comprise at least one connection terminal. The connector may comprise at least one external contact point being connected to a terminal of the external device, and at least one board-mounting portion contacting the at least one connection terminal of the protection circuit board.

The connector housing may comprise a connecting member. The protection circuit board may have a though-hole, and the connecting member may be disposed inside the through-hole.

The battery pack may further include a solder material applied into the though-hole to fix the connecting member inside the though-hole.

The connector housing may comprise a mounting portion contacting a surface of the protection circuit board.

The connector housing and the cover frame may be mechanically connected to each other. The cover frame may comprise a fixing hook, and the connector housing may have a hook groove. The fixing hook may be disposed inside the hook groove to connect the connector housing to the cover frame.

The cover frame may comprise another fixing hook located at an opposite side of the fixing hook. The connector housing may have another hook groove located at an opposite side of the hook groove. The another fixing hook may be disposed inside the another hook groove to connect the connector housing to the cover frame.

The cover frame may have a housing-placing opening, and the connector housing may be exposed through the housing-placing opening.

The cover frame may comprise at least one fixing hook formed at an edge of the housing-placing opening.

The connector housing may be formed of a different material from the cover frame. The connector housing may be formed of a thermosetting resin having higher heat resistance than the cover frame.

The connector may be electrically connected to the protection circuit board.

The connector may be reflow-soldered to the protection circuit board by applying cream solder to a connection terminal of the protection circuit board.

The bare cell may further comprise a label for covering an outer surface of the bare cell. The bare cell may be of a square shape. The bare cell may be a single cell.

BRIEF DESCRIPTION OF DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Now, preferred embodiments of the present invention will be described in more detail with reference to the accompanying drawings.

Figure 1:
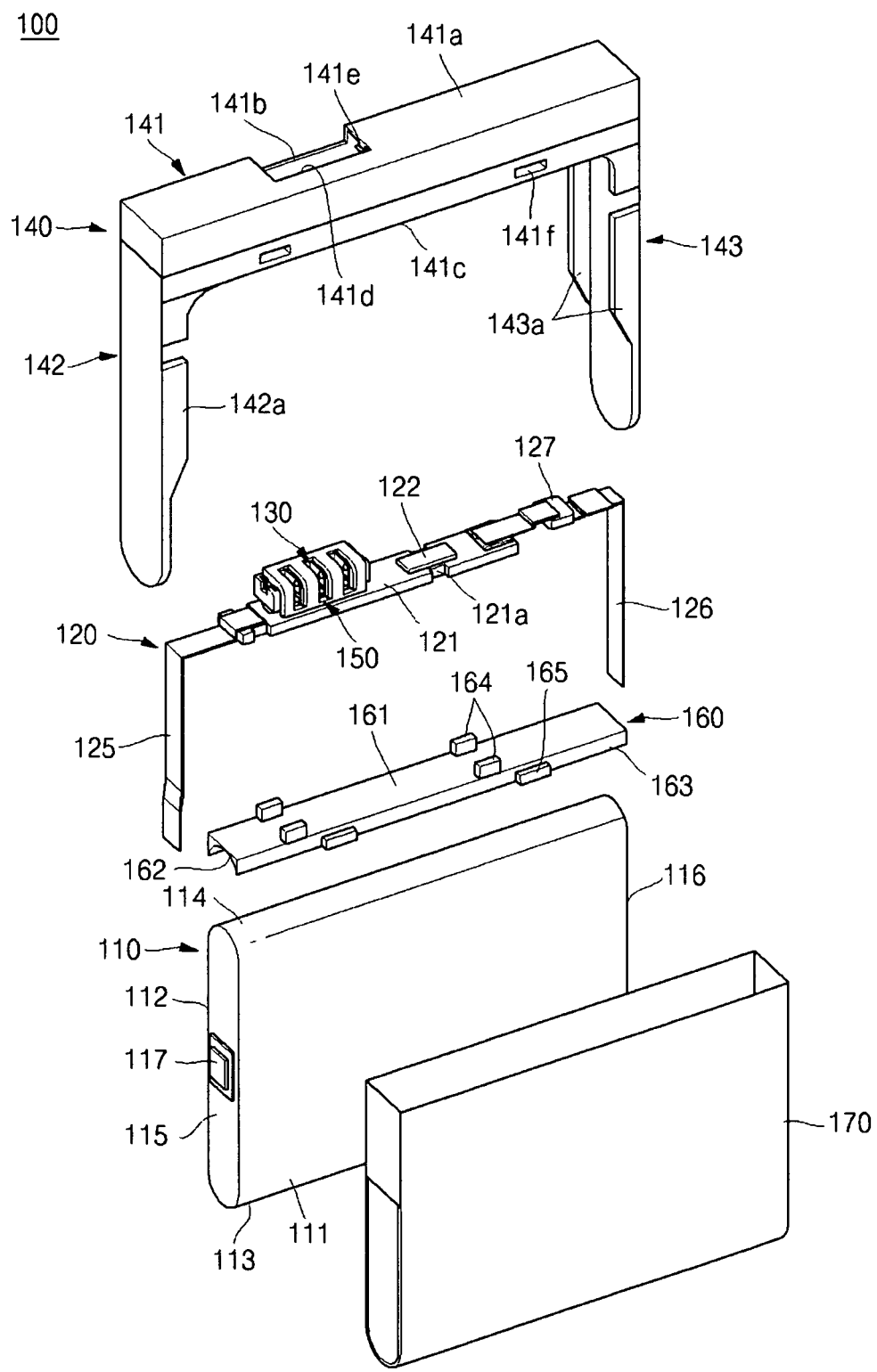
FIG. 1 is an exploded perspective view of a battery pack in accordance with one embodiment of the present invention.
Figure 2:
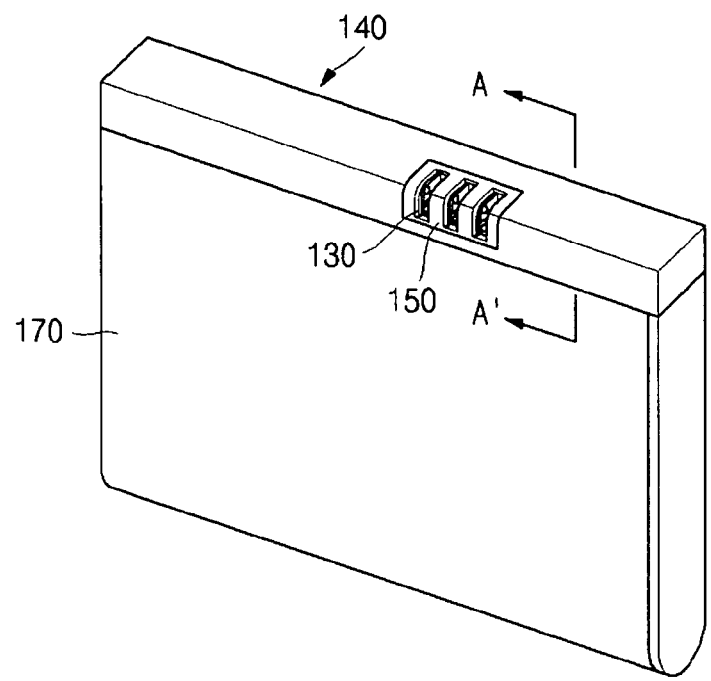
FIG. 2 is an exterior perspective view of a battery pack in accordance with one embodiment of the present invention.
Figure 3:
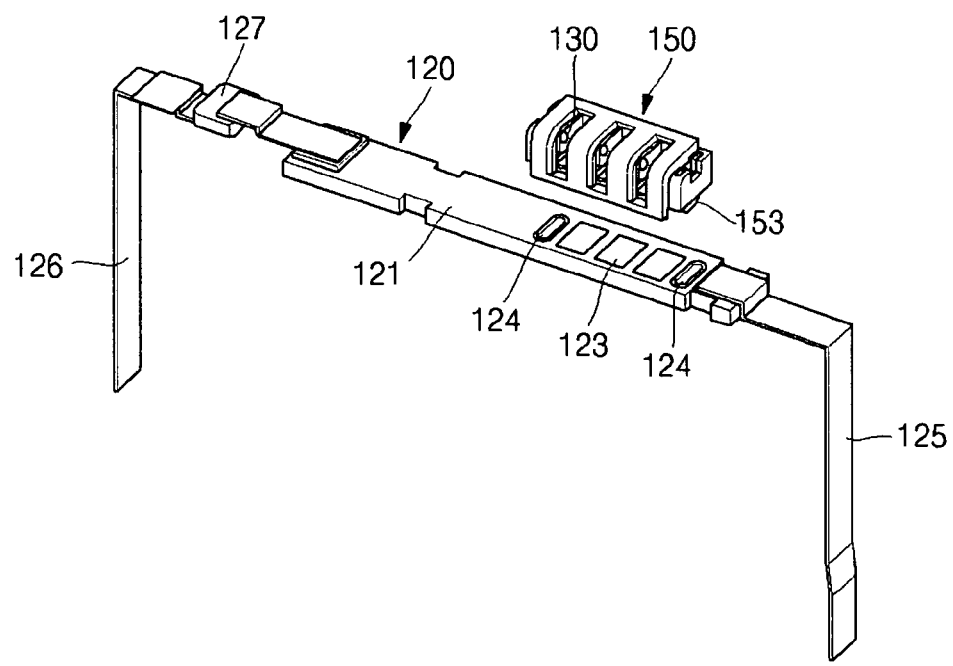
FIG. 3 is an assembly view of a connector housing and a protection circuit board in accordance with one embodiment of the present invention.
Figure 4:
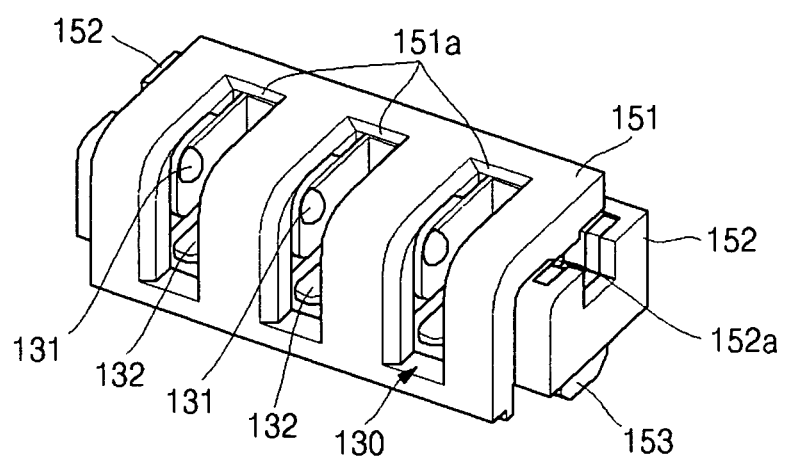
FIG. 4 is a perspective view of a connector housing in accordance with one embodiment of the present invention.
Figure 5:
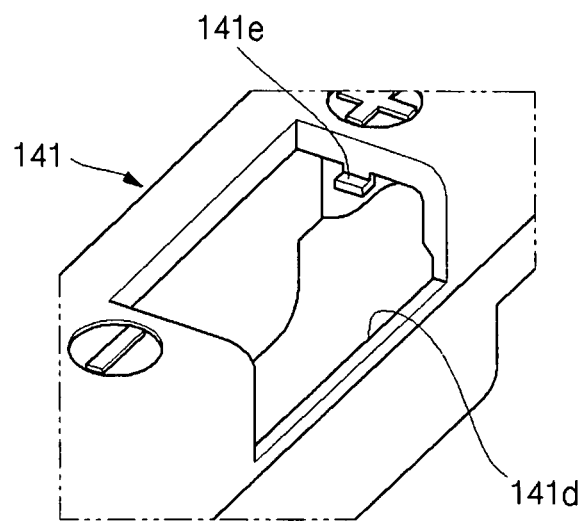
FIG. 5 is a perspective view of a principal part of a cover frame in accordance with one embodiment of the present invention.
Figure 6:
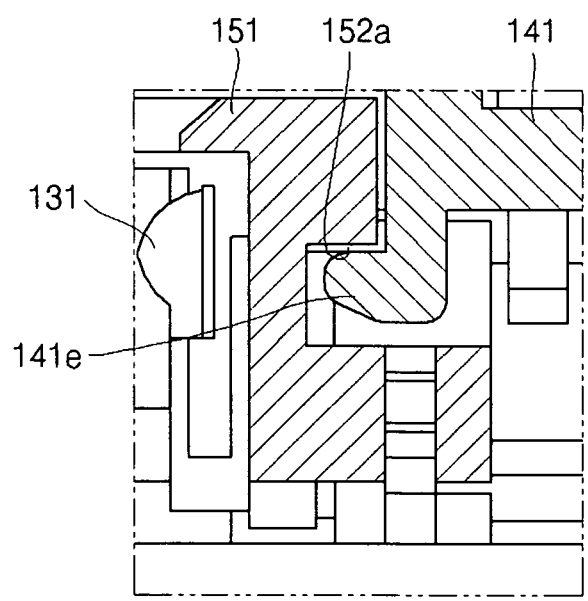
FIG. 6 is a cross-sectional view taken along the line A-A' of FIG. 2, for showing a combined state of a connector housing and a cover frame in accordance with one embodiment of the present invention.

FIG. 1 is an exploded perspective view of a battery pack in accordance with one embodiment of the present invention, FIG. 2 is an exterior perspective view of a battery pack in accordance with one embodiment of the present invention, FIG. 3 is an assembly view of a connector housing and a protection circuit board in accordance with one embodiment of the present invention, FIG. 4 is a perspective view of a connector housing in accordance with one embodiment of the present invention, FIG. 5 is a perspective view of a principal part of a cover frame in accordance with one embodiment of the present invention, and FIG. 6 is a cross-sectional view taken along the line A-A' of FIG. 2, for showing a combined state of a connector housing and a cover frame in accordance with one embodiment of the present invention.

Referring to FIGS. 1 to 6, a battery pack 100 in accordance with one embodiment of the present invention includes a bare cell 110 for generating electric current, a protection circuit board 120 electrically connected to the bare cell 110 to control charge/discharge of the bare cell 110, a connector 130 for transmitting an electric current generated from the bare cell 110 to an external apparatus connected to the battery, a cover frame 140 disposed to protect the protection circuit board 120, and a connector housing 150 accommodating the connector 130 and connected to the cover frame 140. Contact points of the connector are exposed to the outside of the cover frame 140.

The battery pack 100 further includes a holder case 160 disposed to support the protection circuit board 120 in a side of the bare cell 110 on which the protection circuit board 120 is disposed, and a label 170 for covering an outer surface of the bare cell 110.

The bare cell 110 includes an electrode assembly (not shown) which is formed by winding a stack of a positive electrode plate, a negative electrode plate and a separator disposed therebetween, and a can or like container for accommodating the electrode assembly and an electrolyte (not shown). Since the electrode assembly and the electrolyte are placed in the can or the container, the bare cell 110 is substantially of a rectangular shape. Therefore, the bare cell 110 includes first and second sides 111 and 112 corresponding to wide-width, long-length lateral sides, third and fourth sides 113 and 114 formed contiguous with the first and second sides 111 and 112 and corresponding to narrow-width, long-length lateral sides, and fifth and sixth sides 115 and 116 corresponding to upper and lower ends of the first, second, third and fourth sides 111, 112, 113, and 114. An electrode terminal 117 is drawn from the fifth side (or upper side) 115 of the bare cell 110. The electrode terminal 117 can be a positive electrode or a negative electrode, and is preferably a negative electrode terminal. When the electrode terminal is a negative electrode terminal, an outer surface of the bare cell 110 becomes a positive electrode terminal. The bare cell 110, as shown in drawings, is preferably a square-shaped cell. Alternatively, the bare cell 110 may be of a cylindrical shape. The bare cell 110 uses a single cell. However, two or more cells may also be employed, if necessary.

The protection circuit board 120 is provided with a plate-like board body 121, and a protection circuit element 122 disposed on one side of the board body 121 and protecting the bare cell 110 against overcharge/overdischarge of the battery. Further, the protection circuit board 120 is also provided with several connection terminals 123 for transmitting electric current coming from the bare cell 110 to the connector 130. Through-holes 124 are formed on right and left sides of the connection terminals 123. Fixing grooves 121a are formed on both sides of the board body 121.

The protection circuit board 120 includes first and second lead plates 125 and 126 electrically connected to positive and negative electrodes of the bare cell 110, respectively. Between the protection circuit board 120 and the second lead plate 126 is provided a second protection device 127 such as PTC, or the like.

The connector 130 includes external contact points 131 being connected to terminals of an external devices, and board-mounting portions 132 which will be mounted in the connection terminals 123 of the protection circuit board 120. The connector 130 is made of three connector terminals consisting of three pairs of external contact points 131 and board-mounting portions 132 with each pair disposed at each of the connector terminals. The connector 130 is each formed of connector terminal. The connector 130 is pre-assembled into the connector housing 150 prior to being mounted on the protection circuit board 120.

The cover frame 140 includes a main cover 141 for covering the protection circuit board 120, and first and second auxiliary covers 142 and 143 being integrally formed on both ends of the main cover 141 and covering the first and second lead plates 125 and 126 of the protection circuit board 120, respectively.

The main cover 141 includes a first side 141a covering an upper surface of the board body 121 of the protection circuit board 120, and second and third sides 141b and 141c covering both side surfaces of the board body 121. A housing-placing opening 141d for installation of the connector housing 150 is formed on portions of the first side 141a and the second side 141b. Both sides of the housing-placing opening 141d are provided with fixing hooks 141e. Fixing holes 141f are formed on the third side 141c.

The first and second auxiliary covers 142 and 143 are each integrally formed on side ends of the main cover 141, respectively. Sides of the first and second auxiliary covers 142 and 143 are provided with guide ribs 142a and 143a, respectively.

The connector housing 150 includes a housing body 151, and connecting portions 152 formed on both sides of the housing body 151.

The connector housing 150 is preferably formed of a different material from the cover frame 140. That is, the cover frame 140 may be made of a common plastic resin, but the connector housing 150 is preferably formed of a thermosetting resin.

The housing body 151 is of a generally rectangular shape having an inner space. Three slots 151a are formed on the housing body 151. The external contact point 131 of the connector 130 is exposed to the outside through the slot 151a.

At the centers of upper ends of the connecting portions 152 are provided hook groove 152a into which fixing hook 141e of the cover frame is inserted. The hook groove 152a is formed such that the fixing hook 141e is engaged while being guided.

Connecting members 153 which are inserted into the through-holes 124 of the protection circuit board 120 are assembled into the connecting portions 152. The connecting members 153 are inserted into the protection circuit board 120, thereby reinforcing the mounting strength of the connector housing 150. The connecting members 153 are formed of brass and surfaces of the connecting members 153 are nickel-plated. However, materials and plating metals for the connecting members 153 are not limited thereto.

The holder case 160 is of a plate shape. An upper surface 161 of the holder case 160 is formed to have a flat surface, whereas a lower surface 162 thereof is formed to have a curved surface. The upper surface 161 of the holder case 160 are provided with fixing protrusions 164 which are fitted into the fixing grooves 121a of the protection circuit board 120. Further, side surfaces 163 of the holder case 160 are provided with fixing protrusions 165 which are engaged into the fixing holes 141f of the cover frame 140.

The label 170 covers an outer surface of the bare cell 110. The label 170 is attached to cover all the sides except for the fourth side 114 of the bare cell 110 on which the protection circuit board 120 is disposed. As a result, the first and second lead plates 125, 126 of the protection circuit board 120 and the first and second auxiliary covers 142, 143 of the cover frame 140 are fixed to the bare cell 110 by adhesivity of the label 170.

Hereinafter, the operation and effects in accordance with one embodiment of the present invention as constructed above will be described.

First, an electrode assembly, which is the winding structure of a positive electrode plate, a negative electrode plate and a separator, and an electrolyte are placed in a battery case to thereby fabricate the bare cell 110.

The protection circuit board 120 is placed on the fourth side 114 of the bare cell 110. Depending on the battery shape, the protection circuit board 120 can be disposed on a side where the electrode terminal 117 is drawn from the bare cell 110. As the fourth side 114 of the bare cell, on which the protection circuit board 120 is placed, has a curved surface, the curved lower surface of the holder case 160 fits to the fourth side 114 of the bare cell 110. The protection circuit board 120 can be stably disposed on the fourth side 114 of the bare cell 110 by means of the holder case 160.

After the protection circuit board 120 is safely placed on the bare cell 110, the first lead plate 125 of the protection circuit board 120 is electrically connected to the electrode terminal 117 of the bare cell 110. Therefore, the protection circuit board 120 is connected to a negative electrode of the bare cell 110. The second lead plate 126 is electrically connected to the sixth side 116 of the bare cell 110. Accordingly, the protection circuit board 120 is electrically connected to a positive electrode of the bare cell 110.

The protection circuit board 120 is provided with the connector 130. That is, the board-mounting portions 132 of the connector 130 are connected to the connection terminals 123 formed on an upper surface of the protection circuit board 120. For this purpose, a reflow soldering process is used, wherein solder cream is applied to the connection terminals 123 of the protection circuit board 120 and the connector 130 is placed thereon, followed by passing through a soldering machine. Through these processes, the cream solder is melted to fix the connector 130 to the connection terminals 123. The connector 130 is disposed on the protection circuit board 120 after the connector 130 is stored in the connector housing 150. Therefore, upon mounting of the connector 130 on the protection circuit board 120, the connector housing 150 is also disposed on an upper surface of the protection circuit board 120. The connecting members 153 of the connector housing 150 are inserted into the through-holes 124 formed on both sides of the connection terminals 123 of the protection circuit board 120. Then, the solder is flowed via the through-holes 124, and fix the connecting members 153 to the protection circuit board 120.

In a state that the connector 130 and the connector housing 150 were pre-assembled on the protection circuit board 120, the protection circuit board 120 is then assembled into the bare cell 110. The connector housing 150 is made of a thermosetting resin, so it can have higher heat resistance preventing deformation due to heat. Even when the connector housing 150 is exposed to temperature of up to 260° C., no deformation occurs.

Next, the cover frame 140 is assembled on an upper part of the protection circuit board 120. The main cover 141 of the cover frame 140 is disposed on the fourth side 114 of the bare cell 110. The first and second auxiliary covers 142 and 143 are disposed on the fifth and sixth sides 115 and 116 of the bare cell.

Upon installation of the main cover 141, the connector housing 150 is exposed to the outside through the housing-placing opening 141d. Here, the fixing hooks 141e formed on both sides of the housing-placing opening 141d are inserted into the hook groove 152a formed in the connecting portions 152 of both sides of the connector housing 150. The fixing hooks 141e inserted into the hook groove 152a are precisely guided to the correct location where coupling jaws of the fixing hooks 141e are engaged into the insides of the hook groove 152a. Therefore, the fixing hooks are locked at both sides of the connector housing to fix the connector housing. Accordingly, the connector housing 150 is fixed without being separated from the cover frame 140.

Finally, an outer surface of the bare cell 110 is covered with the label 170. The label 170 covers the first and second sides 111 and 112, the third side 113, and the fifth and sixth sides 115 and 116, except for the fourth side 114 of the bare cell 110 where the protection circuit board 120 is disposed. By means of the label 170, the first and second lead plates 125 and 126 of the protection circuit board 120 are fixed to the bare cell 110 while they are insulated from the outside. In addition, the first and second auxiliary covers 142 and 143 of the cover frame 140 are fixed to the bare cell 110 by means of the label 110.

Hereinafter, a battery pack in accordance with another embodiment of the present invention will be described.

Figure 7:
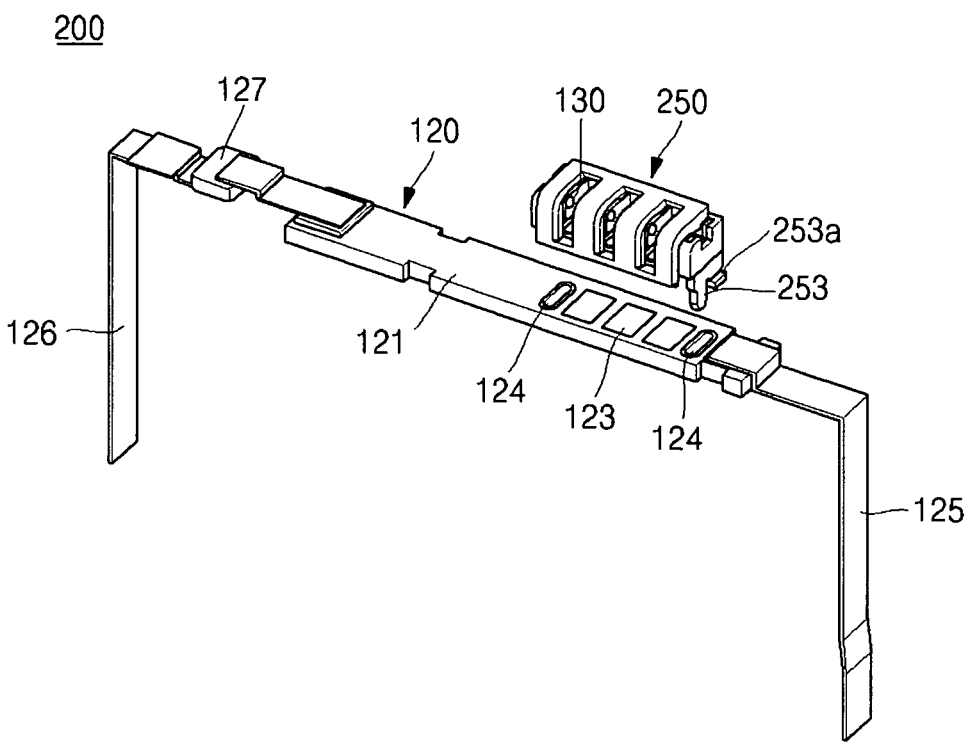
FIG. 7 is an assembly view of a connector housing and a protection circuit board in accordance with another embodiment of the present invention.
Figure 8:
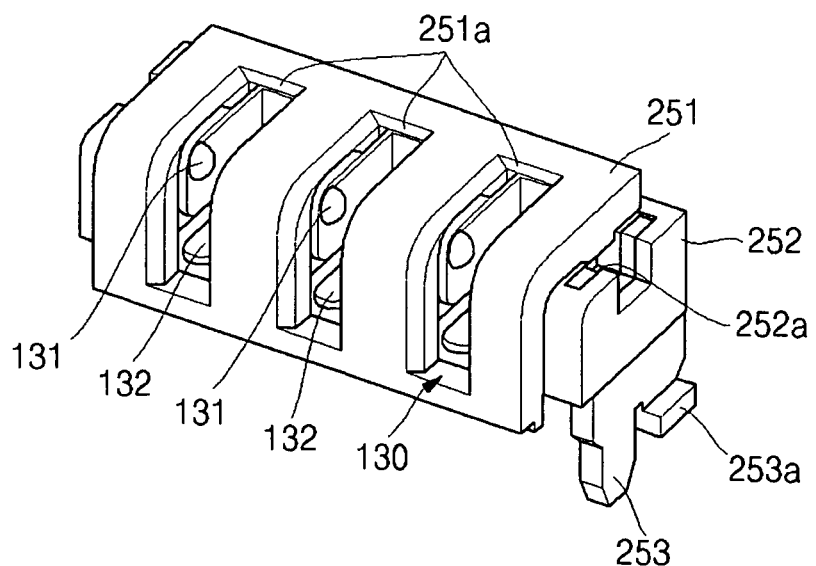
FIG. 8 is a perspective view of a connector housing in accordance with one embodiment of the present invention.

FIG. 7 is an assembly view of a connector housing and a protection circuit board in accordance with another embodiment of the present invention, and FIG. 8 is a perspective view of a connector housing in accordance with one embodiment of the present invention.

Referring to FIGS. 7 and 8, configurations of the bare cell 110, the protection circuit board 120, the connector 130, the cover frame 140, the holder case 160 and the label 170 in a battery pack 200 in accordance with another embodiment of the present invention are identical with those of the previous embodiment of the present invention as shown in FIG. 1, and details thereof will therefore be omitted herein. Like numbers refer to like elements throughout the specification and drawings.

The battery pack 200 in accordance with another embodiment of the present invention is configured in a manner that a connector housing 250 where the connector 130 is disposed has a different configuration than the previous embodiment of the present invention.

The connector housing 250 includes a housing body 251, and connecting portions 252 formed on both side ends of the housing body 251.

The housing body 251 is of a generally rectangular shape having an inner space. Three slots 251*a* are formed on the housing body 251. Therefore, the external contact points 131 of the connector 130 are exposed to the outside of the connector housing 250 through the slots 251*a*.

At the centers of upper ends of the connecting portions 252 are provided hook grooves 252*a* into which fixing hooks 141*e* of the cover frame are inserted. Connecting members 253 which are inserted into the through-holes 124 of the protection circuit board 120 are assembled into the connecting portions 252. The connecting members 253 are inserted into the protection circuit board 120, thereby reinforcing the mounting strength of the connector housing 250. Mounting portions 253*a* are integrally formed on sides of the connecting members 253. The mounting portions 253*a* are formed protruding perpendicular to the connecting members 253. Therefore, the mounting portions 253*a* are mounted on an upper surface of the protection circuit board 120. The connecting members 253 are formed of brass and surfaces of the connecting members 253 are nickel-plated. However, materials and plating metals for the connecting members 253 are not limited thereto.

Hereinafter, further details will be given to the mounting of the connector housing 250 on the protection circuit board 120 in the as-configured battery pack in accordance with another embodiment of the present invention.

Upon the mounting of the connector housing 250 on the protection circuit board 120, the connecting members 253 are inserted into the through-holes 124. When solder is injected through the through-holes 124, the connecting members 253 are fixed to the protection circuit board 120. Here, the mounting portions 253*a* of the connecting members 253 are mounted on an upper surface of the protection circuit board 120, in conjunction with the fixing operation of the connecting members 253. In this manner, the connector housing 250 mounted on an upper surface of the protection circuit board 120 is fixed by the connecting members 253 and the mounting portions 253*a* at both sides thereof, thereby significantly improving the mounting strength of the connector housing 250.

As apparent from the above description, the present invention is capable of achieving improved assembly strength of a battery pack due to solid mounting of a connector housing on a protection circuit board.

The present invention is also capable of achieving enhanced assembly strength of a battery pack due to connection of the connector housing and the cover frame in a non-separable manner.

What is claimed is:

1. A battery pack comprising:
   a bare cell for producing electric current;
   a protection circuit board electrically connected to the bare cell and protecting the bare cell against overcharge and overdischarge thereof;
   a connector mounted on the protection circuit board, the connector electrically connecting the bare cell to an external apparatus;
   a connector housing for accommodating the connector, the connector housing comprising a housing body and a connecting portion formed on a side of the housing body;
   a connecting member assembled into the connecting portion of the connector housing, the connecting member protruding towards the protection circuit board from the connecting portion;
   a mounting portion formed on the connecting member, the mounting portion protruding perpendicular to the protruding direction of the connecting member from the connecting member and protruding perpendicular to the side of the housing body from the connecting member, the mounting portion contacting a surface of the protection circuit board; and
   a cover frame for covering the protection circuit board, the housing body of the connector housing not being covered by the cover frame, wherein the cover frame comprises a first fixing hook, and the connector housing has a first hook groove, the first fixing hook being disposed inside the first hook groove to connect the connector housing to the cover frame mechanically.

2. The battery pack according to claim 1, wherein the protection circuit board comprises at least one connection terminal, and the connector comprises:
   at least one external contact point being connected to a terminal of the external device; and
   at least one board-mounting portion contacting the at least one connection terminal of the protection circuit board.

3. The battery pack according to claim 1, wherein the protection circuit board has a though-hole, the connecting member being disposed inside the through-hole.

4. The battery pack according to claim 3, comprising a solder material applied into the though-hole to fix the connecting member inside the though-hole.

5. The battery pack according to claim 1, wherein the cover frame further comprises a second fixing hook, and the connector housing further has a second hook groove, wherein the second fixing hook and the second hook groove are located at an opposite side of the first fixing hook and the first hook groove.

6. The battery pack according to claim 1, wherein the cover frame has a housing-placing opening, the connector housing being exposed through the housing-placing opening.

7. The battery pack according to claim 6, wherein the cover frame comprises at least one fixing hook formed at an edge of the housing-placing opening.

8. The battery pack according to claim 1, wherein the connector housing is formed of a different material from the cover frame.

9. The battery pack according to claim 8, wherein the connector housing is formed of a thermosetting resin having higher heat resistance than the cover frame.

10. The battery pack according to claim 1, wherein the connector is electrically connected to the protection circuit board.

11. The battery pack according to claim 1, wherein the connector is reflow-soldered to the protection circuit board by applying cream solder to a connection terminal of the protection circuit board.

12. The battery pack according to claim 1, wherein the bare cell further comprises a label for covering an outer surface of the bare cell.

13. The battery pack according to claim 1, wherein the bare cell is of a square shape.

14. The battery pack according to claim 1, wherein the bare cell is a single cell.

15. A method for assembling a battery pack, comprising:
fabricating a bare cell that produces electric current;
installing a connector into a connector housing that comprises a housing body and a connecting portion formed on a side of the housing body;
mounting the connector on a protective circuit board after installing the connector into the connector housing;
placing the protective circuit board on a side surface of the bare cell after mounting the connector on the protective circuit board, the protection circuit board electrically connected to the bare cell and protecting the bare cell against overcharge and overdischarge thereof, the connector electrically connecting the bare cell to an external apparatus; and
disposing a cover frame to cover the protection circuit board after mounting the connector on a protective circuit board, the housing body of the connector housing not being covered by the cover frame, wherein the cover frame comprises a fixing hook, and the connector housing has a hook groove, the fixing hook being disposed inside the hook groove to connect the connector housing to the cover frame mechanically, a connecting member assembled into the connecting portion of the connector housing, the connecting member protruding towards the protection circuit board from the connecting portion, a mounting portion formed on the connecting member, the mounting portion protruding perpendicular to the protruding direction of the connecting member from the connecting member and protruding perpendicular to the side of the housing body from the connecting member, the mounting portion contacting a surface of the protection circuit board.

16. The method of claim 15, wherein the step of disposing a cover frame to cover the protection circuit board is performed after the step of mounting the connector on a protective circuit board.

* * * * *